United States Patent [19]

Barnes et al.

[11] 4,247,683

[45] Jan. 27, 1981

[54] POLYMERIZATION OF 2-PYRROLIDONE WITH QUATERNARY AMMONIUM ACCELERATOR BY RECOVERING AND REUSING SAME

[76] Inventors: Carl E. Barnes, 482 Trinity Pass Rd., New Canaan, Conn. 06840; Arthur C. Barnes, 320 Stamford Ave., Stamford, Conn. 06902

[21] Appl. No.: 84,814

[22] Filed: Oct. 15, 1979

Related U.S. Application Data

[60] Division of Ser. No. 39,773, May 17, 1979, which is a continuation-in-part of Ser. No. 899,066, Apr. 24, 1978, abandoned.

[51] Int. Cl.$^3$ ............................................. C08G 69/24
[52] U.S. Cl. ..................................... 528/313; 526/69; 526/71; 528/315; 528/326; 528/492; 528/496; 528/499
[58] Field of Search ..................... 528/313, 315, 326; 526/69, 71

[56] References Cited

U.S. PATENT DOCUMENTS

| 2,638,463 | 5/1953 | Ney et al. | 528/326 |
| 2,809,958 | 10/1957 | Barnes et al. | 528/326 |
| 2,973,343 | 2/1961 | Ney | 528/326 |
| 3,060,153 | 10/1962 | Follett | 528/326 |
| 3,069,392 | 12/1962 | Clark et al. | 528/326 |
| 3,174,951 | 3/1965 | Taber | 528/326 |
| 3,721,652 | 9/1970 | Barnes | 528/326 |
| 3,835,100 | 9/1974 | Sekiguchi et al. | 528/326 |
| 4,098,774 | 7/1978 | Bacskai | 528/315 |

OTHER PUBLICATIONS

Die Makromolekulare Chemie., 161, p. 64, (1972).

Primary Examiner—Harold D. Anderson

[57] ABSTRACT

A method of recovering and recycling quaternary ammonium accelerators for the polymerization of 2-pyrrolidone is disclosed. The method consists of removing the quaternary ammonium compound together with unpolymerized 2-pyrrolidone by washing the polymer with a solvent for both, such as water or methanol, neutralizing the solution immediately after washing and then removing the solvent at a sufficiently low temperature so that the quaternary ammonium compound is not decomposed.

3 Claims, No Drawings

POLYMERIZATION OF 2-PYRROLIDONE WITH QUATERNARY AMMONIUM ACCELERATOR BY RECOVERING AND REUSING SAME

RELATED APPLICATIONS

This application is a division of Application Ser. No. 039,773 filed May 17, 1979, which in turn is a Continuation-In-Part of Application Ser. No. 899,066, filed April 24, 1978, now abandoned.

BACKGROUND OF THE INVENTION

The polymerization of 2-pyrrolidone utilizing quaternary ammonium compounds to accelerate the polymerization is fully disclosed in our co-pending application Ser. No. 039,773. This invention relates to the recovery and re-use of both the unpolymerized 2-pyrrolidone and the quaternary ammonium accelerator.

At the end of the polymerization, whether for a short or lomg time, there is always some unpolymerized 2-pyrrolidone remaining in the polymer which is usually removed by washing the comminuted polymer with water or other solvent. If a quaternary ammonium accelerator is used this is also present in the polymer and must be removed by washing.

The recovery of the 2-pyrrolidone from the wash water presents no particular problem since it will withstand the temperatures involved in removing the water by distillation. But when the quaternary ammonium compound is also present, thermal stability problems arise and special methods must be devised to prevent decomposition which would result not only in the loss of some of the quaternary ammonium accelerator, but worse, cause the formation of decomposition products which act as inhibitors to the polymerization.

It is accordingly an object of this invention to provide a method or methods of recovering and re-using both the unpolymerized 2-pyrrolidone and the quaternary ammonium accelerator.

SUMMARY OF THE INVENTION

We have found that the thermally sensitive quaternary ammonium compounds used as polymerization accelerators may be satisfactorily recovered from the water, or preferably methanol, extract obtained by washing the polymer with the solvent if the solution is carefully neutralized before removing the solvent by distillation.

There is also disclosed a method of recycling the quaternary ammonium accelerator so recovered together with the recovered 2-pyrrolidone so that they are used effectively without appreciable loss.

DETAILED DESCRIPTION OF A PREFERRED EMBODIMENT

The invention is practiced by first washing the comminuted polymer with water, or preferably methanol or other low-boiling solvent for both the 2-pyrrolidone and the quaternary ammonium compound. Examples of other low boiling solvents which may be used are dichloromethane and ethyl acetate, but methanol is preferred. Acetone is not satisfactory. Either batch or countercurrent washing methods may be used, but in any case when all the 2-pyrrolidone and quaternary ammonium accelerator has been removed from the polymer, the combined washings are immediately neutralized using preferably a mineral acid having the same anion as originally present in the quaternary ammonium compound. Thus if the preferred quaternary ammonium sulfate was used in the first polymerization, sulfuric acid should be used in the neutralization. While other acids may be used, it is desirable to form the sulfate since, as disclosed in our copending application Ser. No. 039,773, the quaternary ammonium sulfates are much more effective accelerating agents.

After neutralizing the solvent may then be removed by vacuum distillation or alternatively a wiped-film evaporator may be used. It is not necessary to remove all the water, which is difficult, since the mixture may be made substantially anhydrous by the method disclosed in our copending application Ser. No. 84,813 filed on even date herewith.

For re-use the recovered quaternary ammonium accelerator dissolved in 2-pyrrolidone, after having been made substantially anhydrous by adding more 2-pyrrolidone if necessary and distilling off about 10 percent of the pyrrolidone under vacuum, is then mixed with a substantially anhydrous solution of an alkali metal pyrrolidonate in 2-pyrrolidone and is now ready for polymerization which is initiated by adding an activator, preferably $CO_2$ or $SO_2$, although other activators may be used if maximum thermal stability is not required.

The following specific examples will serve to illustrate the invention more fully:

EXAMPLE 1.

80 grams of purified 2-pyrrolidone was added to a 250 ml 3-necked flask equipped with a gas inlet tube, a thermometer for measuring pot temperature and a distillation head also having a thermometer for measuring the temperature of the vapor. The distillation head was connected to a condenser and a receiver having a vacuum connection. Water at about 30°–35° C. was circulated through the condenser for cooling.

3.9 grams of 85% assay KOH (0.059 mol of 100% KOH) was added to the pyrrolidone and the system evacuated to a pressure of 10 mm mercury. 23 grams of pyrrolidone was then distilled over to remove the water formed by the reaction of the KOH with the pyrrolidone thus forming a substantially anhydrous solution of potassium pyrrolidonate in pyrrolidone. This solution was then cooled to room temperature, dry nitrogen gas admitted to bring the pressure to atmospheric and the solution was then poured into a small polyethylene bottle and tightly capped for future use.

12.8 grams (0.022 mol) of tetrabutyl ammonium sulfate was added to 80 grams of purified 2-pyrrolidone in a clean 250 ml 3-necked flask connected as described above to a condenser and a source of vacuum. 32 grams of the pyrrolidone was distilled over under reduced pressure to form a substantially anhydrous solution of the quaternary ammonium salt.

The solution of potassium pyrrolidonate in pyrrolidone contained in the polyethylene bottle was then added to this solution after cooling to room temperature and admitting dry nitrogen to bring the pressure to atmospheric. The system was again evacuated and 0.006 mols of $SO_2$ diluted with nitrogen was added to activate the polymerization. The mixture was then immediately poured into a polyethylene polymerization bottle, capped and placed in an over maintained at 38° C. for 3½ hours. At the end of this time the polymer cake was removed and ground.

The comminuted polymer was then washed with five portions of methanol at room temperature, allowing the methanol to remain in contact with the polymer for about 30 minutes each time.

After drying several hours to remove the methanol, the polymer was weighed and the conversion found to be 63% and the viscosity was greater than 148 Stokes (a molecular weight well in excess of 1 million).

Immediately after washing, the methanol extracts were combined and neutralized by adding dilute sulfuric acid. The methanol was then removed by distillation under reduced pressure and recovered. The oil remaining consisted of recovered 2-pyrrolidone and recovered tetrabutyl ammonium sulfate. No attempt was made to remove all the water since this is very difficult and requires heating to a point where there is danger of decomposing the quaternary ammonium salt. Instead, 45 grams of purified 2-pyrrolidone was added to the oil and 33 grams of the pyrrolidone was distilled over under vacuum to remove the residual water thus forming a substantially anhydrous solution of the recovered quaternary ammonium salt in pyrrolidone ready for re-use.

This solution was mixed with a substantially anhydrous solution of potassium pyrrolidonate in 2-pyrrolidone prepared as described above and polymerization initiated by again adding 0.006 mols of $SO_2$. After polymerizing for 5 hours at 38° C. the conversion was 53% and the viscosity 36 Stokes (a molecular weight of about 500,000).

The polymer was again washed with methanol as before and the process repeated 5 times. The polymer was formed each time in about the same conversion of 50% and the viscosity was about 36 Stokes. After the fifth recycle both the conversion and the viscosity began to drop.

The number of recycles possible depends primarily on the purity of the 2-pyrrolidone monomer as well as to some extent on the slight decomposition of the quaternary ammonium salt if neutralization is not promptly carried out.

EXAMPLE 2.

The method of Example 1 was followed except that water was used in place of methanol. The water was removed by means of a wiped film evaporator. Again no attempt was made to remove all of the water since the higher temperatures involved would cause some thermal decomposition of the quaternary ammonium compound.

It will thus be seen that the quaternary ammonium accelerators together with the unpolymerized 2-pyrrolidone may be recovered and recycled thus effectively reducing production costs. Since certain changes may be made in the process as disclosed without departing from the scope of the invention, it is intended that the examples as well as all matter contained in the foregoing description be interpreted as illustrative and not in a limiting sense.

What is claimed is:

1. In the polymerization of 2-pyrrolidone utilizing an alkali metal pyrrolidonate, a quaternary ammonium accelerator and a polymerization activator to form a melt extrudable polymer of 2-pyrrolidone, a method of recovering and re-using both the unpolymerized 2-pyrrolidone and the quaternary ammonium accelerator comprising the steps of:
    (1) extracting the polymer formed with a solvent for both the 2-pyrrolidone and the quaternary ammonium accelerator,
    (2) neutralizing the extract,
    (3) removing the solvent,
    (4) drying the mixture by adding 2-pyrrolidone and distilling over under vacuum sufficient 2-pyrrolidone to remove substantially all of the water,
    (5) adding an anhydrous alkali metal pyrrolidonate plus a quantity of dry 2-pyrrolidone sufficient to make the total amount added and remaining in the mixture equal to that removed from the original mixture in the form of polymer, and
    (6) contacting the resulting mixture with a polymerization activator to again effect polymerization.

2. The method defined in claim 1 wherein the solvent is methanol.

3. The method defined in claim 1 wherein the solvent is water.

* * * * *